3,439,844
TAPPING DEVICE FOR BEER KEGS
AND THE LIKE
Mack S. Johnston, Rolling Hills, Calif., assignor to Johnston Enterprises, Inc., East Kalispell, Mont., a corporation of Montana
Filed Oct. 22, 1965, Ser. No. 502,092
Int. Cl. B65d 83/06, 83/00
U.S. Cl. 222—398                                12 Claims

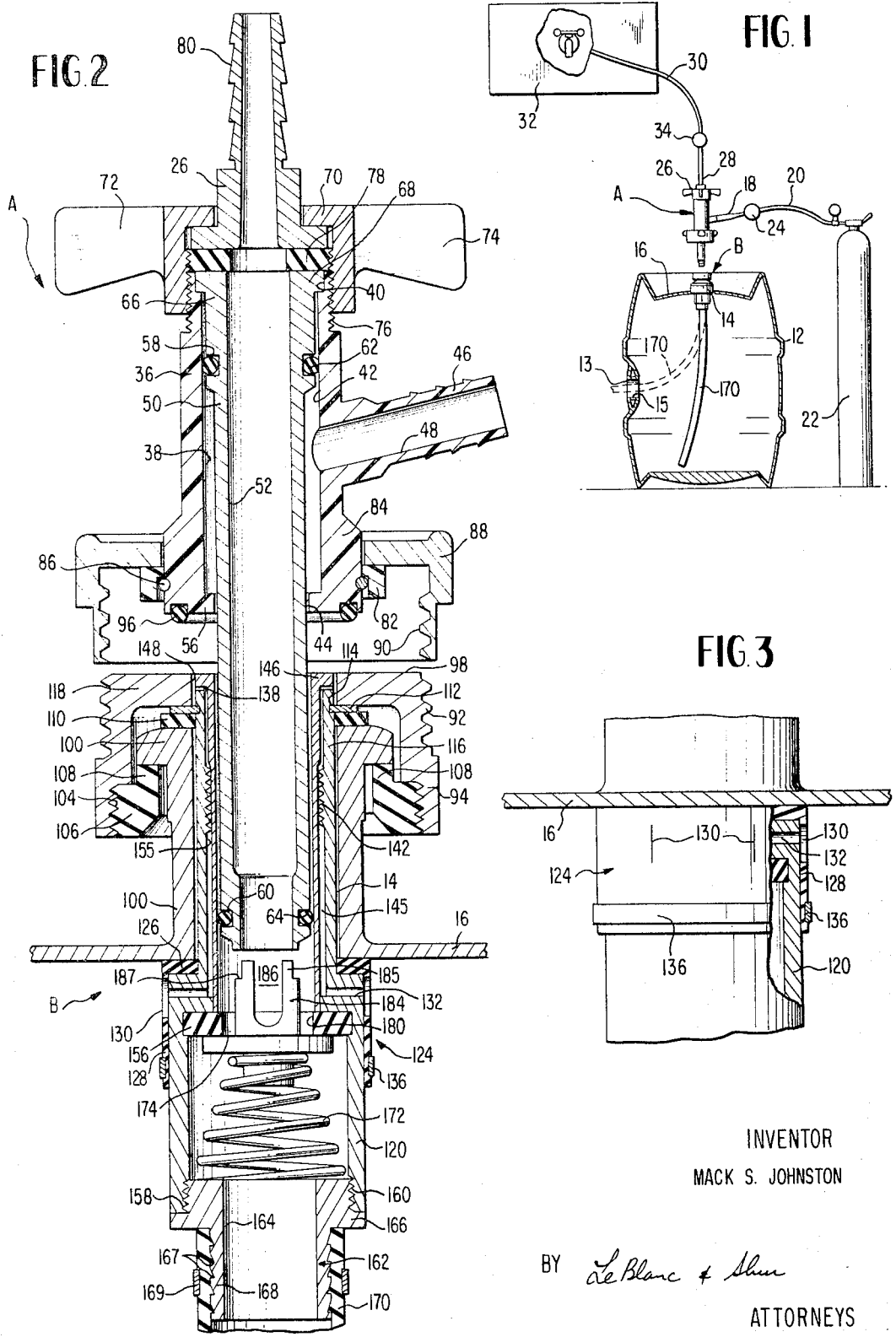

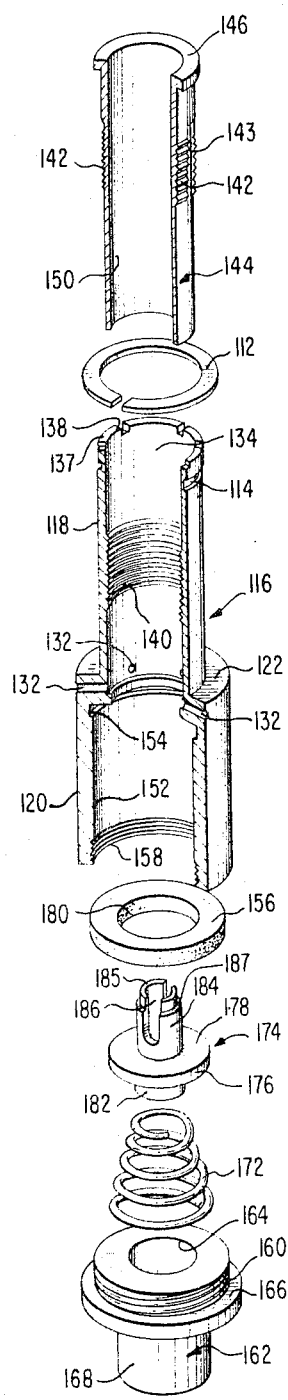
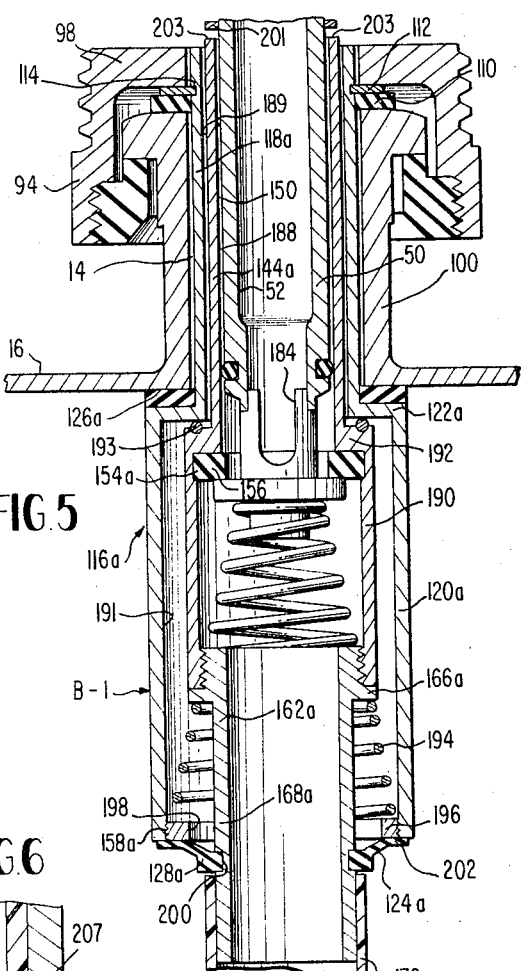
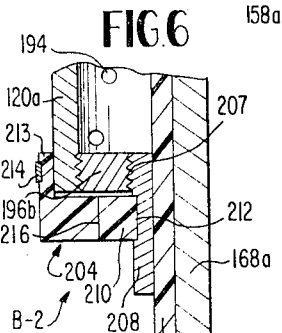
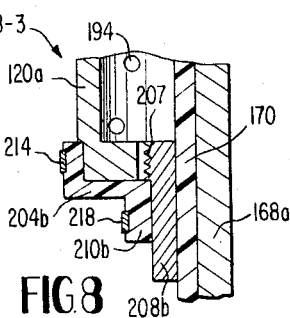
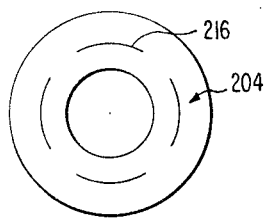
INVENTOR
MACK S. JOHNSTON
BY LeBlanc & Shur
ATTORNEYS

United States Patent Office 3,439,844
Patented Apr. 22, 1969

ABSTRACT OF THE DISCLOSURE

Disclosed is a tapping device for beer kegs and the like in which an adapter is semipermanently attached to the keg and beer is withdrawn by inserting a probe type coupler into the adapter. The adapter has an enlarged lower end within the keg in which is located the beer valve. It provides enlarged beer and gas passages with the beer passage through the center of the adapter which makes the adapter compatible with existing automatic cleaning equipment.

---

This application Ser. No. 502,092 is a continuation-in-part of my copending application Ser. No. 406,682, filed Oct. 27, 1964, for "Siphon Device for Beer Kegs and the Like," now abandoned; said application Ser. No. 406,682 is a continuation-in-part of my copending application Ser. No. 150,982, filed Nov. 8, 1961, entitled, "Siphon Device for Beer Kegs and the Like," and also of my likewise entitled copending application Ser. No. 395,084, filed Sept. 8, 1964 as a continuation of my aforesaid application Ser. No. 150,982. Said application Ser. No. 150,-982 was abandoned (after notice of allowance), in favor of said copending application Ser. No. 395,084, which issued as U.S. Patent No. 3,231,154 on Jan. 25, 1966. Said application Ser. No. 150,982, filed Nov. 8, 1961, was itself a continuation-in-part of my then copending application Ser. No. 25,592 entitled, "Beer Siphon Assembly," filed Apr. 29, 1960, which was abandoned in favor of my application Ser. No. 159,818 entitled "Beer Siphon Assembly," filed Dec. 8, 1961, as a continuation of and copending with said application Ser. No. 25,592; said application Ser. No. 159,818 was issued as U.S. Letters Patent No. 3,156,252 on Nov. 10, 1964.

The present invention relates to a new improved tapping device for drawing fluid such as beer from containers such as beer kegs or barrels, using a gas to drive the fluid from the containers; said tapping device including a subunit, called a "keg adapter," which is semipermanently installed in the keg and a second subunit, called a "dispenser coupler," which is attached to the beer dispensing apparatus in a restaurant, tavern or the like, and is readily connectible to the keg adapter whereby the tapping device is automatically in operating condition. More specifically, this invention relates to a new improved keg adapter, which is usable with conventional beer kegs having standard ¾ inch diameter beer removal openings formed therein and which permits a maximum satisfactory rate of withdrawal of beer, while minimizing the pressure drop and turbulence in the beer during withdrawal.

In the past, the most widely prevailing practice in the beer industry was for a brewery to provide draft beer in retail outlets in "conventional" kegs which had a ¾ inch opening in the top, closed with a bung in the form of a cork or plug. To dispense the beer from the keg, the bartender "taps" the keg by knocking in or pushing in the bung and inserting an elongated tap rod with an associated "siphon" device for drawing the beer from the keg, these being fastened to the keg by means of a "bayonet" or the like connection. This siphon device includes means for injecting compressed air or $CO_2$ through the tap rod into the keg to drive the beer up through the siphone, and also external valve means for respectively controlling the flow of gas into the keg and beer from the keg. A gas supply hose connects the siphon to a source of gas, and another hose connects it to the beer dispensing apparatus mounted on the counter or bar in a restaurant or tavern whereby beer may be dispensed from the keg. When the beer has been withdrawn from the keg to the extent feasible, the bartender then removes the tap and siphon device from the keg, removes the keg from the dispenser cabinet, installs a new keg, and repeats the process of knocking in or pushing in the bung and installing the tap rod and related siphone equipment, etc. The same tap rod and siphon are used for every keg, and must be washed and cleaned periodically to prevent fouling and contamination.

This above-described practice, which has been used for fifty years, has a number of disadvantages for the brewery, the dispensing establishment, and the public: the open, empty kegs, often become filled with debris and trash of every sort. Not infrequently, mice or other objectionable things get into the keg and swell and become difficult to remove through the bung hole. Insects which get into the keg and dry on the walls are very difficult to wash off. Also, old yeast and other solids from the beer inevitably accumulate within the currently used conventional tap and siphon arrangements with resultant accumulation of destructive bacteria feeding on this material. When a new keg is tapped and the gas pressure is applied, the fresh beer surges into uncleaned portions of the tap and siphon devices and this causes the accumulated residue of yeast, bacteria, etc., to be washed down into the keg, thus promptly contaminating the carefully brewed product and also destroying its "brewery-fresh" flavor. This problem is further aggravated by the fact that in dispensing the beer from the keg, there is a tendency of the beer to surge back and forth into the tap chamber where the old yeast and destructive bacteria have accumulated as varying gas pressure is applied when the dispensing apparatus is operated. Hence, when a keg is tapped with conventional methods, the great care in preparing pure, good quality beer at the brewery promptly goes to naught at the dispensing establishment.

Further, on tapping, a substantial quantity of beer usually surges from the keg, with economic loss and resultant mess. Then, when the bartender removes the tap rod and siphon arrangement from the empty keg, residual gas pressure in the keg will often cause the tap and siphon unit to pop out suddenly, sometimes injuring the bartender. Moreover, the beer keg is generally kept in a refrigerated unit under the bar, with limited space, as a result of which conventional tapping of the keg by the bartender is somewhat awkward, time-consuming and difficult (especially if the bartender is not too strong).

In an attempt to eliminate some of these aforementioned problems, one of the largest United States breweries adopted an alternative tapping device which utilizes a non-conventional keg having an opening in the top with a fitting therein for receiving gas, plus another opening in the side of the keg near the bottom with a fitting therein for dispensing the beer. This arrangement requires the manufacture, installation and coupling of the two fittings. Also, the barrel is usually tilted to dispense the beer to the maximum extent, which makes handling more difficult and requires a larger refrigeration unit in the tavern or bar. Furthermore, the nonconventional keg and its two fittings are not only more expensive, but also introduce problems in high speed automatic cleaning and filling of the kegs if the brewery is committed to the above-described conventional kegs as is usually the case. Hence, the above-described fifty year old tapping arrangement is still in common usage not withstanding its many shortcomings.

Moreover, although the two aforementioned brewery tapping devices are the only ones which have had substantial commercial usage heretofore (prior to 1964), numerous different beer tapping devices have been proposed over the past fifty-to-sixty years to attempt to obviate the above-mentioned problems without creating others. However, because of the various practical shortcomings, these numerous proposed devices have not gained substantial acceptance in the draft beer industry primarily because the designers of these devices did not take into account several important "facts of life" in handling draft beer.

One of the primary "facts of life" or considerations which must be taken into account in draft beer tapping devices is that beer, unlike many other liquids, has to be handled with extreme care or otherwise it will lose those qualities, such as taste, proper head and foam, and freedom from cloudiness, which the public demands. For this reason, the flow path for the beer from the keg to the dispensing apparatus must not only be relatively large (to permit a commercially satisfactory rate of withdrawal of the beer), but also must not be too tortuous or contorted, nor can there be too large a pressure drop across the tapping device, caused by an unduly restricted flow path, since otherwise the beer will become "flat" or "wild" (e.g., too much foam). However, balanced against the above is the extremely practical consideration that most (millions) of the beer kegs or barrels used today in the United States, and for that matter, in the world, have a round ¾ inch internal diameter beer dispensing opening formed in their top wall and are designed to have a tapping unit connected thereto by means of a bayonet-type coupling. Therefore, to gain acceptance in the industry, any new beer tapping unit must provide a relatively large, yet unrestricted and nontortuous flow path, in addition to being usable with the conventional ¾ inch diameter beer opening, and the aforesaid means of attachment found on the millions of beer kegs now in use.

However, the problem is not merely one of miniaturization, e.g., if substantial industry penetration is to be expected, an improved tapping device must be "universal" for use with both high and low pressure draft beer dispensing systems that are used in different parts of the United States, without adversely affecting the quality of the beer. Still further, an improved draft beer tapping device, must be rugged so as to withstand rough treatment and handling not only during the travel to and from the breweries, but also at the dispensing establishment.

However, even if the improved tapping device meets these above criterion and obviates the above-described problems, it must be subject to economical manufacture for sale at a competitive price in order to be successful.

Referring now to my copending United States application Ser. No. 395,084, filed Sept. 8, 1964 (which is a continuation of my United States application Ser. No. 150,982, filed Nov. 8, 1961) the above-discussed problems and shortcomings of the prior draft-beer tapping devices have been eliminated by the novel, improved tapping device disclosed and claimed therein. In fact, the improved beer tapping devices as disclosed and claimed in my application Ser. No. 395,084 have been and are getting unprecedented recognition in the brewery industry as affording a highly successful and practical solution to the above-discussed long-standing problems in the industry, as being usable with unmodified conventional kegs having the standard ¾-inch-diameter openings in the top thereof.

Also, my copending application Ser. No. 406,682, filed Oct. 27, 1964 (as a continuation in part of my aforementioned copending applications Ser. No. 395,084 and Ser. No. 150,982), discloses and claims various additional further improvements on the inventions of applications Ser. No. 395,084 and Ser. No. 150,982, as exemplified by FIGURES 9–22 of my said continuation-in-part application. For example, such improvements disclosed and claimed in my copending application Ser. No. 406,682: (1) have made it possible to use standarized models incorporating the inventions of application Ser. No. 395,084 (and Ser. No. 150,982) with "conventional" beer kegs which, however, have widely varying configurations and dimensions; (2) have made it possible to drive draft beer through the air passages, whereby my invention can be used in "series" multiple-keg beer installations in high-volume dispensaries; (3) avoid "wild" beer, even when using a standardized model with both high- and low-pressure systems, due to the improved liquid valve; and (4) provide other advantages such as an improved picnic pump, Golden Gate adapter, etc., as developed more fully in my continuation-in-part application Ser. No. 406,682.

Recognition of the merits and advantages of my tapping device inventions by the U.S. brewery industry is illustrated by the considerable commercial penetration and acceptance achieved by these novel tapping devices in the marketplace, not only at the distribution level but also at the retail level, even though such tapping devices have been available for a relatively short time with only minimal advertisement.

While these improved tapping devices embodying the novel features and constructions of my invention, as disclosed and claimed in my United States application Ser. No. 395,084, provide a most advantageous solution— especially with the conventional kegs—to the draft-beer industry's long-standing problems, I have invented some other novel and improved tapping devices which are also substantial improvements over other prior tapping units heretofore available.

Accordingly, it is a principal object of this invention to provide a new, improved tapping arrangement for packaging and dispensing of beer and like liquids in kegs or barrels which overcomes the above-discussed and other problems and shortcomings of the beer and draft dispensing systems heretofore available, provides a number of important advantages and improved results as hereinafter amplified, and also provides an acceptable commercial alternative to the preferred improved tapping devices disclosed and claimed in my copending U.S. applications Ser. No. 395,084 and Ser. No. 406,682.

Another primary object of this invention is to provide novel tapping arrangements for packaging and dispensing beer for use with conventional beer keg constructions incorporating the standard ¾ inch diameter beer outlet or tapping hole in the keg.

It is another object of the present invention to provide a novel tapping device, especially for conventional beer kegs, utilizing a novel keg adapter which affords a maximum unrestricted and nontortuous flow path for the withdrawal of beer from a keg or barrel through the standard ¾ inch beer removal opening, thereby permitting a maximum rate of satisfactory withdrawal of beer from a conventional beer keg, with either high or low pressure system. It is a related object of this invention to provide a novel keg adapter having an enlarged liquid valve for controlling the flow of beer from the keg, to reduce pressure drop and compression and expansion in the beer removal passageway, thus preventing the beer from becoming "wild" as it is withdrawn from the keg.

Another object of the present invention is to provide a novel keg adapter in which the liquid valve controlling the egress of beer from the keg and the gas check valve controlling the ingress of gas into the keg (via a gas passageway through the adapter) are both completely disposed within the keg. It is another related object to provide a novel, compact keg adapter in which the upper end of this gas check valve communicates with an improved enlarged gas passageway that is uniquely formed in the keg adapter, without structurally weakening the adapter unit or enlarging the unit beyond the commercial size limitations imposed by the ¾ inch standard keg opening of conventional beer kegs in wide usage.

Another object of the present invention is to provide a novel keg adapter including a fixed outer member with a coaxial inner member disposed therein so that these members form therebetween an annular gas passageway of minimal radial dimension but large cross-sectional area, thereby making it possible to use the adapter for tapping multiple beer kegs in "series" draft beer installations, wherein beer must be driven through the gas passages of some of the tapping devices.

Still another object of the present invention is to provide a novel keg adapter usable with conventional beer kegs, comprising a fixed outer member with a coaxial, relatively movable inner member which carries an enlarged liquid valve, with said outer and inner members arranged so that they provide therebetween an annular gas passageway of minimum radial extent but large cross-sectional area, with said members cooperating to close positively the gas passageway when the liquid beer valve is closed. It is a related object to provide such a tapping device whereby assembly of the dispenser coupler to the keg adapter causes the lower end of the coupler probe to open the liquid valve, and also causes said inner adapter member to be displaced relative to the outer fixed member to open the gas passageway in the keg adapter. A related object is to provide such a novel keg adapter including valve means for positively preventing the passage of gas through the passageway whenever the liquid valve in the adapter is closed to seal the keg and to also prevent back flow of liquid from the keg into the gas passageway, thereby preventing contamination, while permitting the ingress of gas into the keg to dispense the beer therefrom.

It is another object of the present invention to provide such novel keg adapter for use with conventional beer kegs with only slight modification of my improved dispensing couplers disclosed, in my above-identified copending applications Ser. No. 395,084 (and Ser. No. 150,-982) and Ser. No. 406,682, and more especially according to the preferred embodiment of FIGURES 9 to 11A in said application Ser. No. 406,682.

It is another object of the present invention to provide such novel keg adapter tapping devices which are easy to keep clean and sanitary by means of available equipment for draft beer racking and filling currently used by U.S. breweries.

It is still another object of the present invention to provide such a new improved means for packaging and dispensing beer or the like from a keg or a like container which achieves the above-discussed objects and advantages, yet can be made at a relatively low price with conventional machinery with a minimum tooling, whereby widespread use of the invention in its intended field is economically feasible.

Still other objects and advanages of the present invention will be apparent from the following description thereof with reference to the accompanying drawings, specification and appended claims.

In the drawings:

FIGURE 1 is a schematic view showing the new tapping device of the present invention as it would be installed in a beer keg with an associated beer dispenser and a source of gas under pressure (the beer keg being broken away and shown in section for clarity);

FIGURE 2 is a vertical sectional view of one embodiment of a new, improved tapping device of the present invention showing in partially assembled relation the novel keg adapter which is installed in a conventional ¾ inch diameter keg wall opening and a dispenser coupler which is applied by the bartender;

FIGURE 3 is a side-elevation and partial sectional view of the new, improved keg adapter shown in FIGURE 2;

FIGURE 4 is an exploded perspective view showing the principal components of the improved keg adapter shown in FIGURE 2;

FIGURE 5 is a vertical cross-sectional view of another embodiment of the novel keg adapter of this invention shown installed within a conventional ¾ ich keg wall opening;

FIGURE 6 is a partial vertical cross-sectional view of a modified gas check valve that may be utilized on the improved keg adapter as shown in FIGURE 5;

FIGURE 7 is a bottom plan view of the gas check valve shown in FIGURE 6; and

FIGURE 8 is a partial vertical cross-sectional view of a still further modified gas check valve that may be also utilized with the improved keg adapter shown in FIGURE 5.

Referring now to FIGURE 1, there is schematically shown a conventional beer keg 12 having a beer outlet opening 14 in its top wall 16 which receives the keg adapter unit B of the present invention, this unit being semipermanently installed in the keg 12 at the brewery. The keg is also conventionally provided with a larger beer bung opening in its side normally closed off by a suitable bung 13. The dispenser coupler unit A of the present invention may be readily connected with the adapter unit B to form a tapping assembly as hereinafter amplified. The dispenser coupler unit A has a gas inlet port and fitting adapted to receive a coupler 18 attached to the end of a gas supply tube 20 which communicates with a pressurized gas supply tank 22. If desired, a valve 24 of any suitable conventional type may be placed in the gas tube 20, adjacent the coupler 18, so that the gas pressure within the keg may be controlled at the location of the keg 12. The dispenser coupler unit A also has a beer exit fitting 26 which is adapted to receive a suitable conventional coupler 28 attached to the end of a flexible tube 30 through which beer is connected with a conventional dispensing apparatus 32 normally mounted on the bar or the like in a restaurant or tavern. If desired, a suitable valve 34 may be associated with the coupler unit B, in a conventional manner, for controlling the flow of beer from keg 12. The arrangement of FIGURE 1 is shown merely for the purpose of illustrating the normal usage of the present invention. Since the components thereof, other than the units A and B, are conventional, and do not comprise a part of the present invention, further description thereof is believed unnecessary, as dispensing arrangements for use with the new improved tapping device of the present invention will be apparent to those skilled in this art in light of the disclosure herein.

Referring now especially to FIGURE 2, the dispenser coupler unit A has a compact, efficient construction which relatively simplifies the manufacturing, cleaning and maintenance thereof, and is generally similar to the coupler disclosed and claimed in my copending United States application Ser. No. 406,682, filed Oct. 27, 1964 (which is a continuation-in-part of my aforementioned application Ser. No. 395,084). This unit comprises a cylindrical head 36 which has a central vertically extending bore 38 of three diameters indicated at 40, 42 and 44 in FIGURE 2. A tubular arm 46 is preferably formed integrally with the head 36 and has a central bore 48 formed therein which communicates with the bore 38. The arm 46 extends from the head 36 and is adapted to receive the end of a piece of tubing that connects the coupler A to a tank of pressurized air or gas, such as the tank 22 shown in FIGURE 1.

The dispenser coupler A also includes a generally tubular probe 50 which is positioned within the bore 38 and which has a central bore 52 that forms the sole liquid passageway through the coupler A. As shown in FIGURE 2, the lower end 54 of the probe extends a substantial distance from the lower end surface 56 of the head 36 for reasons hereinafter amplified. The exterior of the probe 50 is provided with grooves 59 and 60 for receiving sealing rings 62 and 64, which may be "O-rings" of neoprene rubber.

The sealing ring 62 precludes the escape of gas under pressure from between the exterior of the probe 50 and head bore 42 while the sealing ring 64, positioned on the lower end 54 of the probe 50, prevents intercommunication between the gas and liquid passageways when the coupler A and adapter unit B are properly assembled. Moreover, as shown in FIGURE 2, the outer diameter of the probe 50 is less than the diameters of bores 42 and 44 whereby an annular gas passageway is formed therebetween which interconnects the central bore 48 of the tubular arm 46 with the gas passageway formed in the keg adapter B, hereinafter described. Thus, due to the unique arrangement of the head 36, probe 50 and seals 62 and 64, the necessity of drilling a separate gas passageway in the head 36 is eliminated with a resultant savings in manufacturing costs and easier cleaning and maintenance.

As shown in FIGURE 2, the upper end 66 of the probe 50 has a radially outwardly extending flange 68 with an outer diameter and thickness that is substantially equal to the inner diameter and depth of the bore 40 whereby when the probe 50 is properly positioned within the head 36, the upper end of the probe is in alignment with the top of the head 36. When the dispenser coupler A is used in a restaurant, tavern or the like, a conventional cap 70, including integral handles 72 and 74, may be threaded onto the externally threaded portion 76 of the head 36 so that cap 70, in cooperation with sealing gasket 78, holds the probe 50 within the bore 38 in the head, as shown in FIGURE 2, thereby forcing the lower end 54 of the probe 50 to project sufficiently below the bottom 56 of the head 36 so as to open properly the beer valve in keg adapter B whenever the coupler unit A is assembled on the keg adapter B, in the manner described hereinafter. The upper end 80 of the fitting 26 is designed so that the end 28 of a flexible tube (such as tube 30 in FIGURE 1) may be secured thereto for interconnecting the central bore 52 of the probe with the conventional dispensing apparatus utilized in restaurants, taverns and the like (such as shown at 32 in FIGURE 1).

An annular member 82 is secured about the lower, enlarged end 84 of the coupler head 36 by a snap ring 86 for retaining a collar 88 on the coupler head. The snap ring 86 permits the collar 88 to be quickly removed from the head for easy repair, cleaning or replacement, when necessary. The collar 88 is internally threaded at 90 for cooperation with the externally threaded portion 92 of the annular securing ring 94, hereinafter described, and fits loosely on the enlarged end 84 of the head 36 thereby permitting relative rotation between the collar 88 and the head 36.

The bottom surface 56 of the head 36 carries an annular seal 96, which may be an "O-ring" of neoprene rubber and which provides a seal between the coupler unit A and upper surface 98 of the securing ring 94 of the keg adapter B surrounding the liquid and gas passageways and preventing leakage of gas and/or liquid from between units A and B when they are assembled.

The described construction of dispensing coupler A shown in FIGURE 2 is substantially the same as that of the coupler (44d) shown in FIGURES 9, 10, 11 and 11A of my aforementioned copending application Ser. No. 406,682, excepting that the portion of probe 50 projecting below bottom portion 56 of head 36 is considerably longer in coupler A of FIGURE 2 herein. Otherwise further details of the construction of the dispensing coupler may be obtained by reference to said FIGURES 9, 10, 11 and 11A and related description thereof in my said copending application Ser. No. 406,682.

Referring now especially to FIGURES 2–4, the adapter unit B comprises a tubular main body portion 116 of configuration as shown in the drawings, with an exterior annular groove 114 to receive snap ring 112 for securing the adapter within the keg aperture 14, after the adapter B has been inserted through larger beer filling and bung aperture at 13, by means of a flexible siphon tube 170 connected to adapter B, as indicated by the dashed lines in FIGURE 1.

Within the main body 116 of adapter B there is provided a tubular sleeve 144, which as shown in FIGURES 2 and 4 has a hollow central bore 150 providing a liquid passageway and adapted to receive the lower end of dispenser coupler probe 50 and sealing ring 64, when the coupler unit A is assembled to the adapter B. Upper portion 118 of the main adapter body 116 is internally threaded as indicated at 140 in FIGURE 4, and these threads 140 receive interrupted threads 142 formed on the external surface of sleeve 144. The interrupted threads 142 are thus separated around the exterior circumference of the sleeve 144, thus providing longitudinally extending channels or grooves 143 for the passage of gas in the space 155 between the outer surface of sleeve 144 and the interior of main body portion 116. Tubular sleeve 144 is provided at its upper end with a flange 146 which overlies the top edge 137 of adapter main body 116. This edge 137 of adapter body 116 is provided with a plurality of spaced slots 138 through which gas from dispenser A (and tank 22) may pass into the gas passage provided by grooves 143 of interrupted threads 142 when, upon assembly, sleeve 144 is threaded down into the upper section 118 of the main body until the flange 146 engages surface 137.

Extending from the upper section 118 of main body 116 is an enlarged diameter lower section or valve housing portion 120. This section defines a central bore 152 communicating with the bore 134 in upper portion 118 and is provided adjacent its upper end with an annular slot 154 adapted to receive an annular resilient ring 156 which acts as a liquid valve seat. The lower end of the valve housing 120 is internally threaded at 158 for a purpose more fully described below.

The enlarged portion or valve housing 120 defines an upper annular surface or shoulder 122 which, when the unit is assembled, tightly engages the upper flange 126 of a resilient gas check valve 124 (FIGURES 2 and 3), whereby this gas check valve 124 acts partly as a seal. Gas check valve 124 is made of suitable resilient material and provided with a plurality of angularly spaced vertical slits 130 which permit gas to enter into the interior of the keg, but which prevents liquid or gas from passing through check valve 124 into gas passage 145 and out of keg 12. A metal retaining ring 136 preferably is applied around the lower end of gas check valve 124 to secure it tightly against the outer surface of valve housing 120, although suitable dimensioning or other means may be used to seal said lower end against section 120. As shown in FIGURES 2 and 3, slits 130 are preferably in horizontal alignment with a plurality of radial passages 132 angularly spaced about the upper end of the valve housing; and passages 132 communicate with the annular gas flow passage 155 between the exterior sleeve 144 and interior 134 of adapter body 116. For use in "series" draft beer installations, passages 132 should have a cross-sectional area at least as large as that of the passages formed by channels 143 of interrupted threads 42, and the latter should be as large as feasible, so that beer may be "back-driven" through the gas passages. (It is noted, however, that a valve 124 with single slit 130 and a single passage 132 would be operative, and that it is not essential to align slot(s) 130 and aperture(s) 132 for the device to be operative if valve 124 is sufficiently resilient.)

The lower end 120 of body 116 is internally threaded at 158 to receive the external threads 160 formed on a hollow tubular plug 162 (FIGURES 2 and 4). Plug 162 may be provided with a flange 166, which bears against the lower end 120 of main body 116. Surrounding and suitably secured to the lower end 168 of the plug is the upper end of a flexible siphon tube 170. The siphon tube is friction fit or otherwise suitably secured to end 168. One or both elements may be serrated as at 167 per FIGURE 2, or not serrated per FIGURE 4. If dessired, an additional metal band or clamp 169 may be provided to clamp the flexible siphon tube 170 to end 168 of the hollow plug, as in FIGURE 2.

The annular member or plug 162 includes a bore 164 coaxial with the bore 152 but having a diameter approximately equal to the inner diameter of the bore 150 in the tubular member 144. Flange 166 is formed adjacent the threaded portion 160 and the outer periphery thereof extends outwardly so that its outer surface is congruent with the outer surface of the lower member 120. The lower depending portion 168 extends from the flange 166 a relatively short distance toward the bottom of the keg (when adapter unit B is semipermanently installed within the keg) and is secured to the upper end of a preferably plastic siphon tube 170 that extends downwardly to adjacent, but slightly spaced from, the bottom wall of the keg.

The upper end of the plug 162 provides a seat for the lower end of a compression spring 172 that biases a liquid valve means 174 against the underside of the resilient ring or valve seat 156.

The valve 174 comprises a closure member 176 which has a plate-like section 178 adapted to engage the underside of the member or ring 156 and thus close off the central aperture 180 of the ring. A solid cylindrical portion 182 extends downwardly form the plate 178 for insertion within the top end of the coiled compression spring 172. The valve closure member 176 has a generally U-shaped stem portion 184 extending upwardly from its central sealing plate section 178 as shown particularly in FIGURES 2 and 4, whereby fluid may pass through the resultant space 186 and between the legs of the valve stem 184 and the inside walls of the aperture 180 in the valve sealing ring 156. The middle part of the stem portion 184 is removed as shown in the figures so as to enlarge the beer passage space 186 when valve 174 is displaced from the seat ring 156 by the application of the coupler A. This provides superior beer flow characteristics making the keg adapter B universal for high and low pressure beer systems, while avoiding making the beer "wild" as it is drawn from the keg. The outer end of each leg of the valve stem is reduced at 185 to provide surface 187 engaged by the extreme lower end of probe 50 when the adapter and coupler are assembled.

The mode of use of the described adapter B shown in FIGURES 2–4 is as follows:

The adapter B of FIGURES 2–4 preferably comprises an assembly of the components in the exploded view of FIGURE 4 preassembled as illustrated in FIGURE 2, with a suitable siphon tube 170 (e.g., of polyethylene) secured thereto, but without the retaining ring 112 being applied. The adapter B is inserted through the enlarged filling and bung hole 15 and manipulated to position within the standard ¾ inch keg opening 14 the upper section 118 of main body 116. Thereafter this adapter assembly is raised by suitable means (e.g., a tool applying upward force on flange 146), with resilient gas valve flange 126 between shoulder 122 and the inside of keg top wall 16 permitting said adapter assembly to be raised sufficiently to secure retaining ring 112 within groove 114 and overlying a suitable washer 110 of resilient material which provides a seal between the keg flange 100 and keg adapter B.

The keg adapter B is further secured within the ¾ inch diameter opening 14 in conventional beer keg 12 by means adapted to cooperate with the standard so-called "Peerless" beer keg flange 100 usually integrally formed on the top wall 16 of conventianal beer kegs, and also providing means for securing the dispensing coupler A to the keg adapter B, as shown in FIGURE 2. Since the keg neck portions 100 of "conventional" beer kegs used in the United States vary substantially in configuration and dimensions, it is advantageous to secure the keg adapter B in keg 12 by novel means now described.

Referring to FIGURE 2, the keg adapter securing means comprises a preferably metal ring 94 which is externally threaded at 92 to receive the internally threaded collar 88 rotatably secured to the coupler A, and is internally threaded at 104 to receive an externally threaded ring 106 that may be made of plastic or metal. The ring 106 includes a relatively thin wall section having two upwardly projecting, diametrically opposite tabs 108 formed on its inner periphery and adapted to engage the under side of the keg flange 100 when the plastic or metal ring 106 is threaded completely within the securing ring 94.

This securing means is more fuly shown and described in my copending application Ser. No. 406,682 (especially FIGURE 14), and that disclosure is incorporated herein by reference. Suffice to say that in use the preferably plastic ring 106 is first snapped over the keg flange 100 so that it rests on the top of the keg with the tabs 108 extending upwardly therefrom. The preferably metal securing ring 94 is then applied over the upper end of adapter B and the keg flange 100 as shown in FIGURE 2, and is threaded onto the plastic ring 106, causing the plastic ring 106 to be drawn within the securing ring 94, particularly until the upper ends of the tabs 108 contact the underside of the keg flange 100. When the rings 94 and 106 are thus assembled, as shown in FIGURE 2, they cooperate with the keg flange 100 to clamp the retaining ring 112 of adapter B between the underside of the radially inwardly directed portion 118 of the securing ring 94 and the top of the keg flange 100, through seal 110, to lock the keg adapter B within the opening 14 of conventional keg 12 so that the keg may be used as now described.

It is noted that adapter retaining ring 112 may have any one of various constructions, according to commercially available types. The construction of ring 112 shown in the drawings is merely illustrative; in actual practice the retaining ring 112 may be frusto-conical with the smaller interior edge cooperating with groove 114 disposed above the outer edge of ring 112 which is clamped between keg flange sealing ring 110 and the flange 118 of adapter securing ring 98.

When the keg incorporating described adapter B is filled at the brewery, it is automatically sealed and ready to be shipped to a dispensing establishment, generally with an inexpensive removable plastic or paper seal placed over the upper end of securing ring 98 and members 144 and 116 to prevent ingress of dust or the like within bore 150 or annular gas passage 148.

At the dispensing establishment, all the bartender is required to do to tap the keg is to remove the aforesaid dust seal (not shown) and insert the lower end 54 of probe 50 of dispenser coupler A within the bore 150, and collar 82 of coupler A is then threaded on portion 92 of the adapter securing ring 94. As the coupler A is totally secured to adapter securing ring 94, the lower end 54 of probe 50 contacts the upper end of the stem 184 (surfaces 187) and moves the valve 174 away from the seating ring 156 thereby allowing beer to be dispensed from the keg, via siphon tube 170, through bore 164 in the plug 162, through the space formed between the sealing ring 156 and valve plate 176, through the inner bore 52 in the probe 50, the bore formed in the fitting 26, and thence through tube 30 to the conventional dispensing apparatus 32. With gas valve 24 opened, gas under pressure passes down the central bore 48 of the tubluar arm 46 into the bore 38, and thence through the annular space between the probe 50 and the bore 44, the annular space between the collar 88 and the end of flange 118, and annular chamber 148 and radial slots 138, down between the members 116 and 144 through vertical channels or flutes 143 and out the apertures 132 and through the slits 130 of gas valve 124 into the keg to drive the beer through siphon tube 170, etc. Sealing rings 62, 64 and 96 prevent communication between the beer and gas passages and also prevent gas or beer from passing out between the coupler and keg adapter units when they are thus assembled.

After the keg is fully tapped, removal of the coupler unit A is readily and quickly accomplished by unthreading collar 82, thus withdrawing the coupler probe 50 to close the liquid valve and automatically reseal the keg as the lower end 54 of the probe 50 premits the valve 174 to reseat against the ring 156.

Referring especially now to FIGURES 5-8, there are shown other keg adapter embodiments B-1, B-2 and B-3, each similar to adapter B shown in FIGURES 2-4, in that it is inserted into an empty beer keg 22 through the keg filling opening 15 subsequently closed off by bung 13, by means of a flexible siphon tube 170 as illustrated in FIGURE 1 and described above with reference to adapter B and FIGURES 1-4. For clarity, and to avoid duplicate description, parts of the adapter embodiments B-1, B-2 B and FIGURES 1-4. For clarity, and to avoid duplicate and B-3 of FIGURES 5-8 which are like those in the adapter embodiment B-1 of FIGURES 2-4 are identified with like numerals; whereas, modified corresponding parts are identified with like numerals plus the subscript a, b or c to the extent feasible.

The principal differences between the keg adapter B-1 in FIGURE 5 and the unit shown in FIGURE 2 is that the FIGURE 5 unit includes a modified resilient gas check valve and a further valve for positively closing the gas passageway formed in the adapter unit when the liquid valve 174 is closed. Also, the tubular member 144a is extended down within the lower member 120a whereby when the lower end 54 of the probe 50 displaces the liquid valve 174 the tubular member or beer sleeve 144a moves longitudinally with respect to the body 116 thereby opening the additional valve in the gas passage means whereby gas under pressure may pass through the gas passage means and out through the resilient check valve 124a formed at its terminal end.

The adapter body 116a is generally similar to the body 116 shown in FIGURES 2 and 4, but the upper end of member 116a is solid and extends to about or slightly beyond the upper end of member 116a whereby it is at or beyond upper surface 98 of the securing ring 94. Also, the radial apertures 132 and grooves 138 are omitted from the shoulder portion 122 and the upper end of the body member 144a, respectively. There is a shorter threaded portion 158 at the lower end of the body portion 120. The body 116a is retained within the standard ¾ inch diameter opening 14 in the keg flange 100 by snap ring 112 which fits into the groove 114 in the upper end of the member 118a and which is secured between the upper end of the keg flange 100 and the securing ring 94. An annular seal 126a is positioned between the shoulder portion 122a and under the surface of the keg flange 100 to correctly position the body 116a and to prevent leakage between the body and the keg flange opening 14.

Further, threaded portions 140 of member 118a and 142 of member 114 are omitted for reasons to be noted. In place of tubular member 144, the keg adapter unit B shown in FIGURE 5 has an inner body member 144a which is generally congruent to the main or outer body 116a in that it has an upper cylindrical portion 188 which is coaxial with the upper member 118a but spaced from the member 118a thereby leaving an annular space 189 between these two members. Likewise, the lower body member 190 is coaxial with but spaced radially from the member 120a thereby forming an annular passage 191 between these members. A shoulder portion 192 provided with sealing ring 193 connects the members 188 and 190.

The lower member 190 has a groove 154a formed therein adjacent the shoulder portion 192 for receiving a resilient seating ring 156 as a seat for the liquid valve 174. The valve 174 is biased upwardly against the seating ring 156 by the coil spring 172, the other end of which sits on or is supported by the upper end of the member 162a that is threaded into the lower end of member 190.

Member 162a has a flange 166a whose outer periphery is the same diameter as the outer periphery of member 90 and has a lower depending portion 168a which extends downwardly toward the bottom of the beer keg and is adapted to receive the upper end of the flexible and preferably plastic siphon tube 170 as shown.

The inner body 144a is biased upwardly whereby shoulder portion 192 and resilient O-ring 193 thereon are urged into positive sealing relation with the shoulder portion 122a formed on the body member 116a by coil spring 194, the upper end of which engages flange 166a of the member 162a, and lower end of which sits on an inward flange section 196 threaded into lower end section 158a of member 120a, or otherwise secured thereto, with a central aperture 198 formed therein coaxial with the longitudinal axis of the members 116a and 144a.

A resilient annular gas check valve 124a is positioned adjacent the central aperture 198 at the lower end of member 120a to control the ingress of gas into the beer keg. The interior portion 128a of the valve 124a is constructed and dimensioned to be secured within groove 200 formed in the outer surface of tubular section 168, with the exterior portion 202 of the valve 124a designed to be biased against inward flange 196 provided at the lower end of the member 120a. More particularly, valve 124a is formed like an annular cup with a portion or lip 202 biased upwardly against the portion 196 by the internal inherent resilience of the resilient material used in molding the valve 124a, thereby causing the annular lip 202 to remain in sealing contact with the portion 196 at all times except when the air pressure in the gas passage formed in the adapter unit B is greater than the gas and liquid pressure within the keg, at which time gas is forced from the chamber 191 between lip 202 and inturned portion 196 thereby permitting the ingress of gas under pressure within the keg.

The mode of operation of keg adapter B-1 shown in FIGURE 5 is as follows:

When lower end 54 of probe 50 of coupler A (per lower part shown in FIGURE 5) is inserted within the bore 150 of the member 188 it contacts the upper end of the extension stem 184, thereby depressing or displacing the valve 174 from the seating ring 156. After the liquid valve is open, further downward movement of the probe brings an annular ring 201 rigidly mounted on the probe into engagement with the top surface 203 of member 188. The last stages of probe movement drive member 188 downwardly against the bias of second spring 194 and causes member 188 to be moved longitudinally relative to the body member 116a thereby separating the shoulder portions 122a and 192 and permitting gas to pass between the annular space formed between the bodies 116a and 144a and through the aperture 198 and out between the lips 202 and the portion 196 whenever the gas pressure within the gas passage is sufficient to overcome the bias in the lips 202 and the gas and liquid pressure within the keg since the upper end of the member 188 is now in alignment with the upper end of member 118a and the upper surface 98 of the annular ring 94. There is no communication between the gas and liquid passages in keg adapter B-1 shown in FIGURE 5 because of the seals 64, 62 and 96.

FIGURES 6 and 7 show an adapter B-2 having a resilient gas check valve 204 substituted for gas check valve 124a in keg adapter B-1 shown in FIGURE 5. When resilient valve 204 is utilized, the central aperture of ring portion 196b is provided with threads 206 cooperating with external threads 207 on tubular member 208, with one set of threads 206 or 207 being interrupted similar to threads 142 and grooves 143 utilized on member 144 as shown in FIGURE 4 to provide gas passages. The tubular member 208 may be made of Teflon or like material, with the upper end of siphon tube 170 extending through its central aperture and secured to tubular section 168a to allow sliding movement between siphon tube 170 and tubular section 208 but prevent the passage of liquid or gas therebetween.

The resilient gas check valve 204 has an inner portion 210 which is positioned and dimensioned to be resiliently retained within a groove 212 formed in the outer surface of tube section 208, and an annular outer cylindrical portion 213 which is adapted to be securely fastened to the lower outer peripheral end of the member 120a by suitable means, such as a metal band 214. The mid-portion of resilient gas check valve 204 is proved with a plurality of spaced slits 216, preferably formed as arcs of a circle about the central longitudinal axis of the annular resilient valve 204. Slits 216 permit passage of gas under pressure into the keg from the gas passage in keg adapter B–2 into the keg 12, but prevent ingress of beer into the keg adapter B–2.

As shown in FIGURE 8, valve 204 of FIGURES 6–7 may be modified by extending portion 210b downwardly along the tubular member 208, and using means such as a second metallic band 218 to secure this portion 210 to member 208 (as an alternative to retaining groove 212 in tubular member 208 per FIGURE 6).

In recapitulation, it is apparent from the foregoing that the present invention provides a novel useful tapping device utilizing a keg adapter unit which may be semi-permanently installed in a conventional beer keg by insertion into the beer keg from inside the keg via the larger conventional beer filling bung hole in the side wall of the keg, achieving objectives discussed above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A siphon adapter for installation in a keg having top, bottom and side walls with a dispensing aperture in one wall and a larger filling aperture in another wall of said keg, whereby said adapter seals said dispensing aperture in said keg and provides means for removal of liquid therefrom, said keg adapter being characterized in that it comprises a main fitting member having a first portion adapted to be received through said keg aperture and an enlarged portion within said keg, said enlarged portion being of a size intermediate said keg dispensing and filling apertures, means for securing said fitting member to said keg, means for providing a seal between the exterior of said fitting member and the keg in which the adapter is installed, said main fitting member including a central liquid passageway therethrough for permitting passage of liquid from the interior of said keg to the exterior thereof, and a surrounding, at least partially arcuate, gas passageway from the outside of said keg to the inside thereof, said gas passageway bypassing said liquid passageway to permit flow of gas toward the inside of said keg, a normally closed liquid valve in said liquid passageway within said enlarged portion of said fitting member, siphon tube means coupled to the interior end of the liquid passageway in said fitting member, and gas check valve means carried by said fitting member for valving said gas passageway to the interior of said keg.

2. An adapter according to claim 1 wherein said siphon tube means is flexible.

3. An adapter according to claim 1 wherein said dispensing aperture has a diameter of approximately ¾ inch.

4. A siphon adapted for installation in a keg having top, bottom and side walls with an aperture in at least one keg wall, whereby the adapter seals said keg and provides means for removal of liquid therefrom, said keg adapter being characterized in that it comprises; a main fitting member having a first tubular portion adapted to be received through said keg aperture and an enlarged tubular portion positioned within said keg, said enlarged portion having a greater diameter than said keg aperture, means for securing said fitting member to said keg, means for providing a seal between the exterior of said fitting member and the keg in which said adapter is installed, a sleeve within said first tubular portion of said fitting member and extending into said enlarged tubular portion, said sleeve defining a gas passageway between said sleeve and said fitting member for permitting gas to flow from the outside of said keg to the inside thereof, said sleeve further defining a central liquid passageway bypassing said gas passageway to permit passage of liquid from the interior of said keg to the exterior thereof, a valve seat adjacent the end of said sleeve within said enlarged portion of said fitting member, valve means in said enlarged portion, means in said enlarged portion of said fitting member resiliently biasing said valve means against said valve seat to normally close off said liquid passageway, siphon tube means connected with the interior end of the liquid passageway in said fitting member, and flexible gas check means carried by said fitting member for valving said gas passageway to the interior of said keg.

5. An adapter according to claim 4 wherein said sleeve is coupled to said fitting member by a series of broken threads defining gas flow channels or flutes between said sleeve and said fitting member.

6. An adapter according to claim 5 wherein said sleeve is slidable through said fitting member, and valve means mounted on said sleeve for positively valving said gas passageway.

7. Liquid storing and dispensing apparatus for beer or the like, comprising; a keg having top, bottom and side walls with an opening in at least one wall; a keg adapter; means for sealingly securing said adapter in said keg opening; said keg adapter having a main fitting member with a first portion received through said keg opening and an enlarged portion within said keg, said enlarged portion having a diameter greater than ¾ inch, means for securing said fitting member to said keg, means for providing a seal between the exterior of said fitting member and the keg in which the adapter is installed, said main fitting member including a central liquid passageway therethrough for permitting passage of liquid from the interior of said keg to the exterior thereof, and a surrounding, at least partially arcuate, gas passageway from the outside of said keg to the inside thereof, said gas passageway bypassing said liquid passageway to permit flow of gas toward the inside of said keg, a normally closed liquid valve in said liquid passageway within said enlarged portion of said fitting member, siphon tube means coupled to the interior end of the liquid passageway in said fitting member, and gas check valve means carried by said fitting member for valving said gas passageway to the interior of said keg.

8. Apparatus according to claim 7 wherein said fitting member includes a central sleeve defining said liquid passageway in said first portion of said fitting member, the space between said sleeve and the remainder of said fitting member constituting a portion of said gas passageway, said sleeve being joined to the remainder of said fitting member by a series of broken threads.

9. Apparatus according to claim 7 wherein said fitting member includes a slidable sleeve, and valve means between said sleeve and the remainder of said fitting member for positively valving said gas passageway in accordance with the movement of said sleeve.

10. Apparatus according to claim 9 wherein said sleeve is provided with an external shoulder, a valving ring mounted on said shoulder, and resilient means acting on said sleeve and normally biasing said valving ring against said enlarged portion of said fitting member to close off said gas passageway.

11. A tapping device or siphon for a keg or the like container for liquids such as beer which has top, bottom and side walls with an aperture in one wall of said keg, characterized in that it comprises an adapter with a main fitting member having a first tubular portion adapted to be received through said keg aperture and an enlarged tubular portion positioned within said keg, said enlarged portion having a greater diameter than said keg aperture, means for securing said fitting member to said keg, means for providing a seal between the exterior of said fitting member and the keg in which said adapter is installed, a sleeve within said first tubular portion of said fitting member and extending into said enlarged tubular portion, said sleeve defining a gas passageway between said sleeve and said fitting member for permitting gas to flow from the outside of said keg to the inside thereof, said sleeve further defining a central liquid passageway bypassing said gas passageway to permit passage of liquid from the interior of said keg to the exterior thereof, a valve seat adjacent the end of said sleeve within said enlarged portion of said fitting member, valve means in said enlarged portion, means in said enlarged portion of said fitting member resiliently biasing said valve means against said valve seat to normally close off said liquid passageway, siphon tube means connected with the interior end of the liquid passageway in said fitting member, and flexible gas check valve means carried by said fitting member for valving said gas passageway to the interior of said keg, a liquid dispensing coupler connected to said keg adapter, said liquid dispensing coupler comprising a head member having means for opening said normally closed liquid valve in said keg adapter when said dispensing coupler is assembled with said keg adapter; liquid passage means in said coupler head communicating with the outlet of said liquid passage means in said adapter to permit the flow of liquid from said keg through said coupler head; gas passage means in said head, and sealing means between said keg adapter and said dispensing coupler whereby one end of said gas passage means in said coupler head is in communication with the gas passage means in said adapter, bypassing said liquid passage means in said keg adapter and said dispensing coupler.

12. Apparatus according to claim 11 wherein said adapter sleeve is movable, means carried by said adapter sleeve for positively valving said gas passageway in accordance with the movement of said sleeve, and means on said coupler for moving said sleeve and positive valving means to the open position when said adapter and coupler are assembled.

References Cited
UNITED STATES PATENTS

| | | | |
|---|---|---|---|
| 2,223,012 | 11/1940 | Wanderski et al. | 222—400.7 |
| 2,715,980 | 8/1955 | Frick | 222—494 X |
| 2,741,497 | 4/1956 | Risley | 285—415 X |
| 3,065,885 | 11/1962 | Chatten | 222—400.7 |
| 3,085,820 | 4/1963 | Pollia | 285—415 X |
| 3,090,530 | 5/1963 | Peeps | 222—400.7 |
| 3,173,586 | 3/1965 | Pawson | 222—400.7 |
| 3,228,413 | 1/1966 | Stevens | 222—400.7 X |
| 3,231,149 | 1/1966 | Yuza | 222—494 X |
| 3,272,404 | 9/1966 | Graves et al. | 222—400.7 X |

ROBERT B. REEVES, *Primary Examiner.*

N. L. STACK, JR., *Assistant Examiner.*

U.S. Cl. X. R.

222—400.7; 285—415

U.S. DEPARTMENT OF COMMERCE
PATENT OFFICE
Washington, D.C. 20231

UNITED STATES PATENT OFFICE
CERTIFICATE OF CORRECTION

Patent No. 3,439,844                              April 22, 1969

Mack S. Johnston

It is certified that error appears in the above identified patent and that said Letters Patent are hereby corrected as shown below:

Column 2, line 4, "siphone" should read -- siphon --; line 15, "siphone" should read -- siphon --. Column 3, line 38, after "new" insert -- draft --. Column 7, line 3, "59" should read -- 58 --. Column 9, line 4, "dessired" should read -- desired --; line 29, "form" should read -- from --. Column 10 line 38, "the", first occurrence, should read -- this --. Column 11, cancel line 18. Column 12, line 12, after "and" insert -- the --. Column 13, line 72, "adapted" should read -- adapter --.

Signed and sealed this 5th day of May 1970.

(SEAL)
Attest:

Edward M. Fletcher, Jr.

Attesting Officer

WILLIAM E. SCHUYLER, JR.

Commissioner of Patents